United States Patent
Lee et al.

(10) Patent No.: US 9,544,553 B2
(45) Date of Patent: Jan. 10, 2017

(54) PROJECTOR, COLOR WHEEL PROTECTION CIRCUIT, AND COLOR WHEEL PROTECTION METHOD

(71) Applicants: Cheng-Shen Lee, Hsin-Chu (TW); Ming-Te Lin, Hsin-Chu (TW)

(72) Inventors: Cheng-Shen Lee, Hsin-Chu (TW); Ming-Te Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 146 days.

(21) Appl. No.: 14/162,767

(22) Filed: Jan. 24, 2014

(65) Prior Publication Data

US 2014/0204346 A1    Jul. 24, 2014

(30) Foreign Application Priority Data

Jan. 24, 2013  (CN) .......................... 2013 1 0027594

(51) Int. Cl.
*H04N 9/31*  (2006.01)
*G03B 21/20*  (2006.01)

(52) U.S. Cl.
CPC .......... *H04N 9/3114* (2013.01); *H04N 9/3194* (2013.01)

(58) Field of Classification Search
CPC ... H04N 9/3114; H04N 9/3194; G02B 26/007; G02B 26/008; G02B 7/006; G02B 5/20; G02B 5/201; G02B 5/205; G02B 5/22; G02B 5/223; G02B 5/226; G02B 5/23; G03B 17/12; G03B 21/204; F21S 10/00; F21S 10/005; F21S 10/007; F21S 10/02; F21S 10/023; F21S 10/026
USPC ............... 353/31, 121, 30, 85; 359/889, 890
See application file for complete search history.

(56) References Cited

U.S. PATENT DOCUMENTS

| 6,621,529 B2 | 9/2003 | Ohara et al. | |
|---|---|---|---|
| 7,177,238 B2 | 2/2007 | Huang | |
| 7,942,534 B2 | 5/2011 | Miyazawa | |
| 2006/0001840 A1* | 1/2006 | Kurihara | H04N 9/3179 353/85 |
| 2011/0242497 A1* | 10/2011 | Fukano | G02B 26/008 353/31 |
| 2013/0107230 A1* | 5/2013 | Murai | G03B 21/204 353/85 |

FOREIGN PATENT DOCUMENTS

| CN | 1306375 | 8/2001 |
|---|---|---|
| CN | 101369090 | 2/2009 |
| CN | 101750855 | 6/2010 |

OTHER PUBLICATIONS

English Translation of CN 101750855, published on Jun. 23, 2010.*

* cited by examiner

*Primary Examiner* — Bao-Luan Le
*Assistant Examiner* — Christopher Lamb, II
(74) *Attorney, Agent, or Firm* — Jianq Chyun IP Office

(57) ABSTRACT

The invention provides a projector, a color wheel protection circuit, and a color wheel protection method. The projector includes a color wheel, a light source, a controller, and a protection circuit. The light source is controlled by a light source control signal to provide an illumination beam to the color wheel. The controller is used for providing the light source control signal to the light source. The protection circuit includes a resetting signal generator and a logic operator. The resetting signal generator is used for generating a resetting trigger signal according to the rotation speed of the color wheel, and generating a resetting output signal according to the resetting trigger signal. The logic operator is used for receiving the light source control signal and the resetting output signal, and resetting the light source control signal according to the resetting output signal.

16 Claims, 3 Drawing Sheets

PROJECTOR, COLOR WHEEL PROTECTION CIRCUIT, AND COLOR WHEEL PROTECTION METHOD

CROSS-REFERENCE TO RELATED APPLICATION

This application claims the priority benefit of China application serial no. 201310027594.0, filed on Jan. 24, 2013. The entirety of the above-mentioned patent application is hereby incorporated by reference herein and made a part of this specification.

FIELD OF THE INVENTION

The invention generally relates to a protection circuit of imaging device and a protection method thereof, and more particularly, to a projector, a color wheel protection circuit, and a color wheel protection method.

DESCRIPTION OF RELATED ART

Today's digital light processing-based projector (DLP-based projector) adopts a time sequencing type color wheel with color-mixing method; that is a red frame, a green frame and a blue frame are sequentially projected on a screen to form a color frame through mixing colors. In order to enhance the projecting capacity of the projector, the illumination luminance of the light source of the projector needs to be advanced, which, however, increases the output power of the light source when advancing the illumination luminance of the light source of the projector, i.e., the heat produced by the light source is increased as well. The color wheel of the projector is directly irradiated by the illumination beam of the light source, so that with the increased illumination luminance of the light source, the color wheel suffers more heat so as to increase the burning opportunity of the color wheel. Accordingly, how the color wheel avoids burning under the circumstance of increasing illumination luminance of the light source has become a subject of the design of the projector.

U.S. Pat. No. 6,621,529 discloses a common color wheel speed system, U.S. Pat. No. 7,942,534 discloses a projector achieving a wide variety of gradation and color representation, a projection system, a program and a recording medium, and U.S. Pat. No. 7,177,238 discloses a related apparatus for adapting rotation speed adjustments of a motor via a pause mode while accessing data from an optical disc, all which are the relating-most patents in the prior art. However, the above-mentioned three patents do not cover the instruction about controlling the turning on/off the light source according to the rotation speed of the color wheel thereof.

SUMMARY OF THE INVENTION

Accordingly, the invention is directed to a color wheel protection circuit and a color wheel protection method of a projector for advancing the lifetime of the projector and the color wheel.

Other objectives and advantages of the invention should be further indicated by the disclosures of the invention, and omitted herein for simplicity.

To achieve the above-mentioned or other objectives, an embodiment of the invention provides a projector including a color wheel, a light source, a controller, and a protection circuit. The light source is controlled by a light source control signal to provide an illumination beam to the color wheel. The controller is used for providing the light source control signal to the light source. The protection circuit includes a resetting signal generator and a logic operator. The resetting signal generator is for generating a resetting trigger signal according to the rotation speed of the color wheel, and generating a resetting output signal according to the resetting trigger signal. The logic operator is used for receiving the light source control signal and the resetting output signal, and resetting the light source control signal according to the resetting output signal.

To achieve the above-mentioned or other objectives, an embodiment of the invention provides a color wheel protection circuit including a resetting signal generator and a logic operator. The resetting signal generator is used for generating a resetting trigger signal according to the rotation speed of the color wheel of the projector, and generating a resetting output signal according to the resetting trigger signal. The logic operator is used for receiving the light source control signal provided to a light source and the resetting output signal, and resetting the light source control signal according to the resetting output signal.

To achieve the above-mentioned or other objectives, an embodiment of the invention provides a color wheel protection method including following steps: generating a resetting trigger signal according to the rotation speed of a color wheel of a projector; generating a resetting output signal according to the resetting trigger signal; and resetting a light source control signal provided to a light source of a projector according to the resetting output signal.

Based on the description above, in the embodiment of the invention, the projector, the color wheel protection circuit, and the color wheel protection method of the invention may generate a resetting trigger signal according to the rotation speed of the color wheel, then generate a resetting output signal according to the resetting trigger signal and then rest a light source control signal of the light source of the projector according to the resetting output signal. Therefore, the illumination beam provided by the light source to an abnormally-operating color wheel may be avoided in this invention so as to prevent the generated heat from affecting the operation of the entire projector, avoid damaging the color wheel and advance the lifetime of the color wheel and the imaging quality of the projector.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
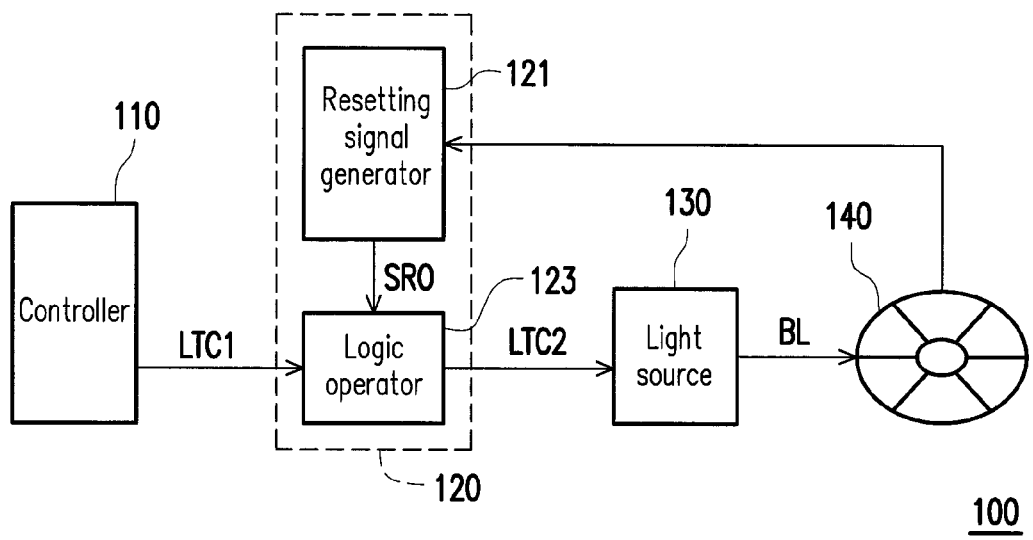
FIG. 1 is a schematic system diagram of a projector according to an embodiment of the invention.

Referring to FIG. 1, in the embodiment, a projector 100 includes a controller 110, a protection circuit 120, a light source 130, and a color wheel 140. The protection circuit 120 includes a resetting signal generator 121 and a logic operator 123. The controller 110 provides a light source control signal LTC1 to the logic operator 123. The resetting signal generator 121 generates a resetting output signal SRO according to the rotation speed of the color wheel 140. The logic operator 123 receives the light source control signal LTC1 and the resetting output signal SRO, and resets the light source control signal LTC1 according to the resetting output signal SRO. In more details, the light source 130 is controlled by a light source control signal LTC2 to provide an illumination beam BL to the color wheel 140. That is, the logic operator 123 resets the light source control signal LTC1 according to the light source control signal LTC1 and the resetting output signal SRO and generates the light source control signal LTC2 so that whether the light source 130 providing the illumination beam BL or not may be controlled.

Furthermore, the resetting signal generator 121 is used to judge whether or not the operation of the color wheel 140 is normal according to the rotation speed of the color wheel 140 and thereby decide the logic level of the resetting trigger signal. Then, the resetting signal generator 121 decides the logic level of the resetting output signal SRO according to the logic level and the pulse width of the resetting trigger signal. Then, the logic operator 123 decides whether or not to reset the light source control signal LTC1 through the resetting output signal SRO so that whether the light source 130 providing the illumination beam BL or not may be further controlled.

Figure 2:
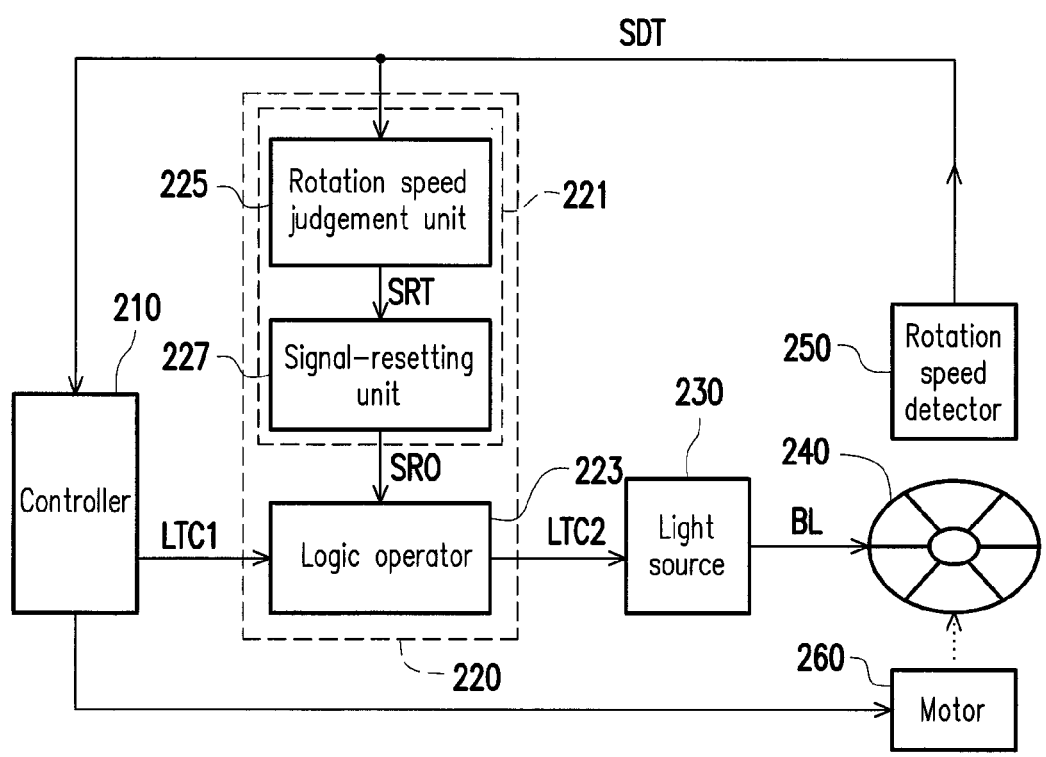
FIG. 2 is a schematic system diagram of a projector according to another embodiment of the invention.

Referring to FIG. 2, in the embodiment, a projector 200 includes a controller 210, a protection circuit 220, a light source 230, a color wheel 240, a rotation speed detector 250, and a motor 260. The protection circuit 220 includes a resetting signal generator 221 and a logic operator 223. The resetting signal generator 221 includes a rotation speed judgement unit 225 and a signal-resetting unit 227. In the embodiment, the rotation speed detector 250 is electrically connected to the color wheel 240, the resetting signal generator 221, and the controller 210. The motor 260 is electrically connected to the controller 210 for driving the color wheel 240.

In the embodiment, after the projector 200 is started (after the projector 200 is turned on), the controller 210 drives the motor 260 to make the color wheel 240 start to rotate. After the rotation speed detector 250 detects out the rotation speed of the color wheel 240, a detection signal SDT is generated according to the rotation speed of the color wheel 240, and the rotation speed detector 250 provides the detection signal SDT to the resetting signal generator 221. The resetting signal generator 221 may generate a resetting trigger signal SRT according to the detection signal SDT. In the embodiment, the rotation speed judgement unit 225 of the resetting signal generator 221 generates the resetting trigger signal SRT according to the detection signal SDT representing the rotation speed of the color wheel 240. The signal-resetting unit 227 is coupled to the rotation speed judgement unit 225, and generates the resetting output signal SRO according to the resetting trigger signal SRT.

In the embodiment, the rotation speed judgement unit 225 judges the rotation speed of the color wheel 240 according to the detection signal SDT and judges whether or not the operation of the color wheel 240 is normal and thereby decides the logic level of the resetting trigger signal SRT, wherein so-called abnormal operation of the color wheel 240 means, for example, too fast or too slow rotation speed. Then, the signal-resetting unit 227 decides the logic level of the resetting output signal SRO according to the logic level and the pulse width of the resetting trigger signal SRT. When the operation of the color wheel 240 is normal, the logic operator 223 does not reset the light source control signal LTC1 to control the light source 230 for providing the illumination beam BL. On the contrary, when the operation of the color wheel 240 is abnormal, the logic operator 223 resets the light source control signal LTC1 to control the light source 230 for not providing the illumination beam BL. In this way, the illumination beam BL durably irradiating the operation-abnormal color wheel 240 to lead overheat or damage of the color wheel 240 may be avoided.

In an embodiment of the invention, the rotation speed detector 250 may provide the detection signal SDT to the controller 210 and the controller 210 may judge the operation of the color wheel 240 is normal or not according to the detection signal SDT. When the operation of the color wheel 240 is abnormal, the controller 210 may generate the light source control signal LTC1 to further turn off the light source 230, even turn off the projector 200, so that the illumination beam BL durably irradiating the operation-abnormal color wheel 240 to lead overheat or damage of the color wheel 240 may be avoided.

Figure 3:
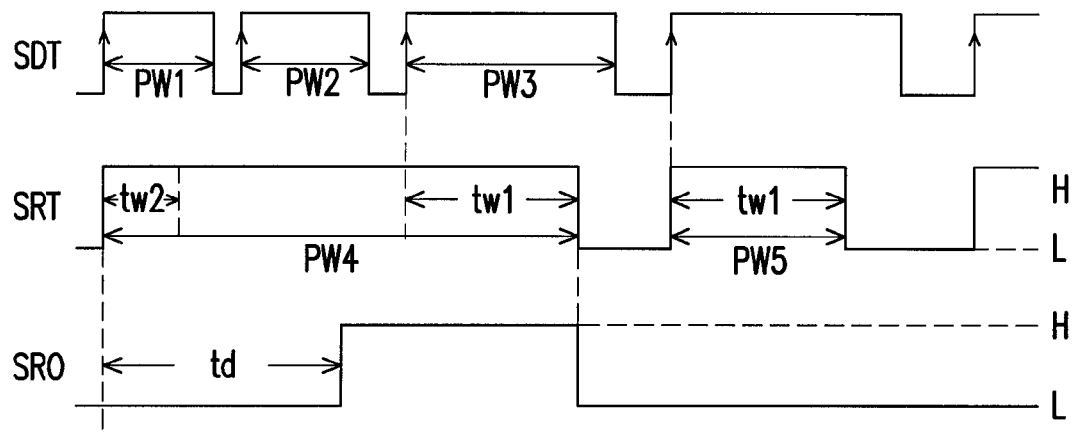
FIG. 3 is a diagram of driving signals according to an embodiment of the invention.

Referring to FIGS. 2 and 3, in the embodiment, the detection signal SDT is, for example, a periodical pulse signal and the rotation speed judgement unit 225 of the resetting signal generator 221 may generate the resetting trigger signal SRT according to the pulse width of the detection signal SDT. Moreover, in the embodiment, the resetting signal generator 221 may judge whether or not the pulse widths of the detection signal SDT (for example, PW1-PW3) are greater than a predetermined resetting trigger threshold (for example, tw1) through the rotation speed judgement unit 225 so as to judge whether or not the rotation speed of the color wheel 240 is too slow. For example, when the pulse widths PW1 and PW2 of the detection signal SDT are not greater than (i.e., less than or equal to) the resetting trigger threshold tw1, it indicates the rotation speed of the color wheel 240 is not too slow and the rotation speed judgement unit 225 of the resetting signal generator 221 keeps the resetting trigger signal SRT at the first logic level (taking high logic level "H" as an example); on the contrary, when the pulse width PW3 of the detection signal SDT is greater than the resetting trigger threshold tw1, it indicates the rotation speed of the color wheel 240 is too slow and the rotation speed judgement unit 225 of the resetting signal generator 221 makes the resetting trigger signal SRT transited to the second logic level (taking low logic level "L" as an example) from the first logic level. However, the invention does not limit the value of the resetting trigger threshold. For example, the resetting trigger threshold may be a shorter resetting trigger threshold tw2. In the same way, the embodiment may use the above-mentioned method for judging whether or not the rotation speed of the color wheel 240 is too fast.

The signal-resetting unit 227 may generate the resetting output signal SRO according to the resetting trigger signal SRT. In the embodiment, when the resetting trigger signal SRT is transited to a second logic level (for example, low logic level) from a first logic level (for example, high logic level), the signal-resetting unit 227 of the resetting signal generator 221 makes the resetting output signal SRO transited to the second logic level (for example, low logic level) from the first logic level (for example, high logic level).

On the other hand, when the resetting output signal SRO is the second logic level (for example, low logic level), the signal-resetting unit 227 may judge whether or not the pulse widths of the resetting trigger signal SRT (for example, PW4 and PW5) are greater than a predetermined resetting output threshold: td so as to decide whether or not the resetting output signal SRO is transited to the first logic level (for example, high logic level) from the second logic level (for example, low logic level). In more details, when the pulse width PW4 of the resetting trigger signal SRT is greater than the resetting output threshold td, the signal-resetting unit 227 of the resetting signal generator 221 makes the resetting output signal SRO transited to the first logic level (for example, high logic level) from the second logic level (for example, low logic level); on the contrary, when the pulse width PW5 of the resetting trigger signal SRT is not greater than (i.e., less than or equal to) the resetting output threshold td, the signal-resetting unit 227 of the resetting signal generator 221 keeps the resetting output signal at the second logic level (for example, low logic level).

Figure 4:
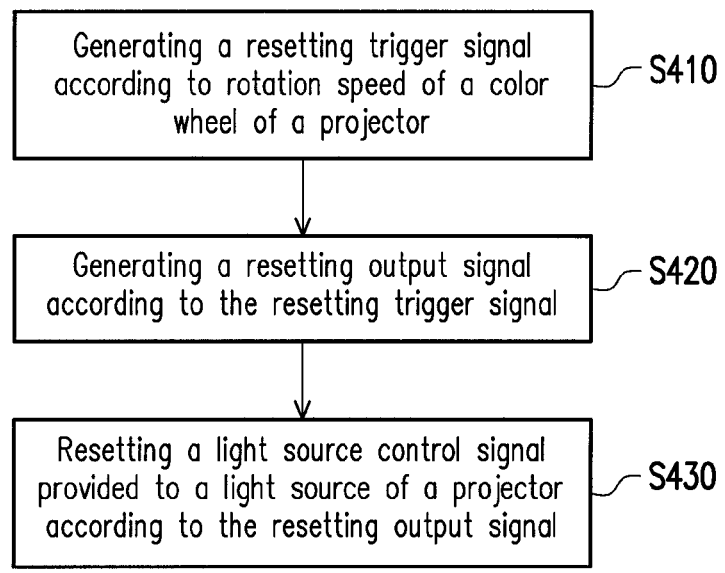
FIG. 4 is a flowchart of a color wheel protection method according to an embodiment of the invention.

Referring to FIG. 4, in the embodiment, the color wheel protection method includes following steps: generating a resetting trigger signal according to the rotation speed of a color wheel of a projector (step S410); generating a resetting output signal according to the resetting trigger signal (step S420); and resetting a light source control signal provided to a light source of a projector according to the resetting output signal (step S430).

Figure 5:
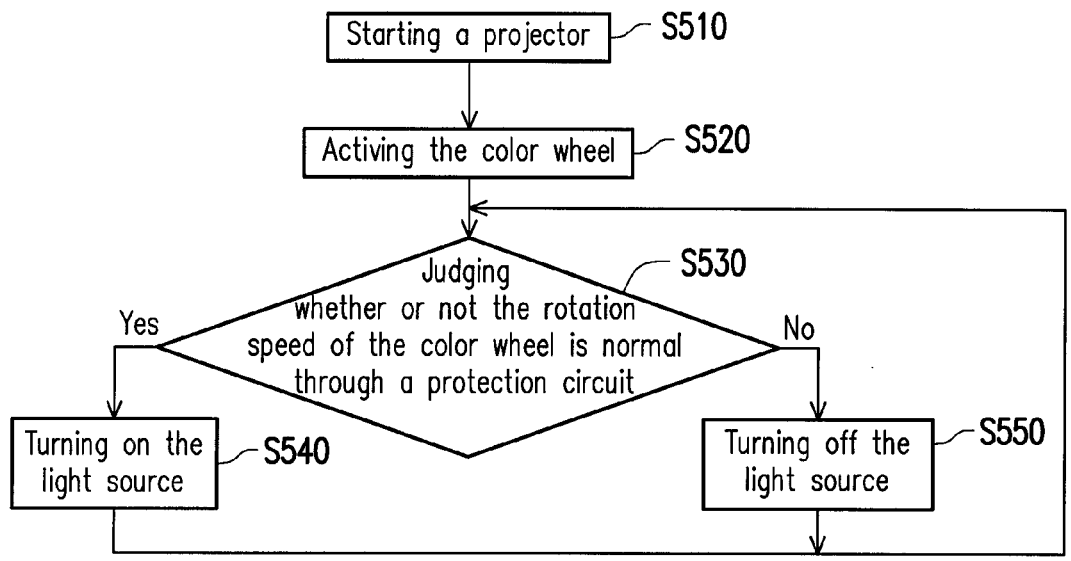
FIG. 5 is a flowchart of a color wheel protection method according to another embodiment of the invention.

Referring to FIG. 5, in the embodiment, the color wheel protection method includes following steps: after starting a projector (step S510), activing the color wheel to mark the color wheel start to rotate (step S520); judging whether or not the rotation speed of the color wheel is normal through a protection circuit (step S530); when the rotation speed of the color wheel is normal, i.e., when the judgement result of step S530 is 'yes', turning on the light source (step S540) to provide the illumination beam to the color wheel; when the rotation speed of the color wheel is abnormal, i.e., when the judgement result of step S530 is 'no', turning off the light source (step S550) to stop providing the illumination beam; after steps S540 and S550, going back to step S530 to keep judging whether or not the rotation speed of the color wheel is normal.

Figure 6:
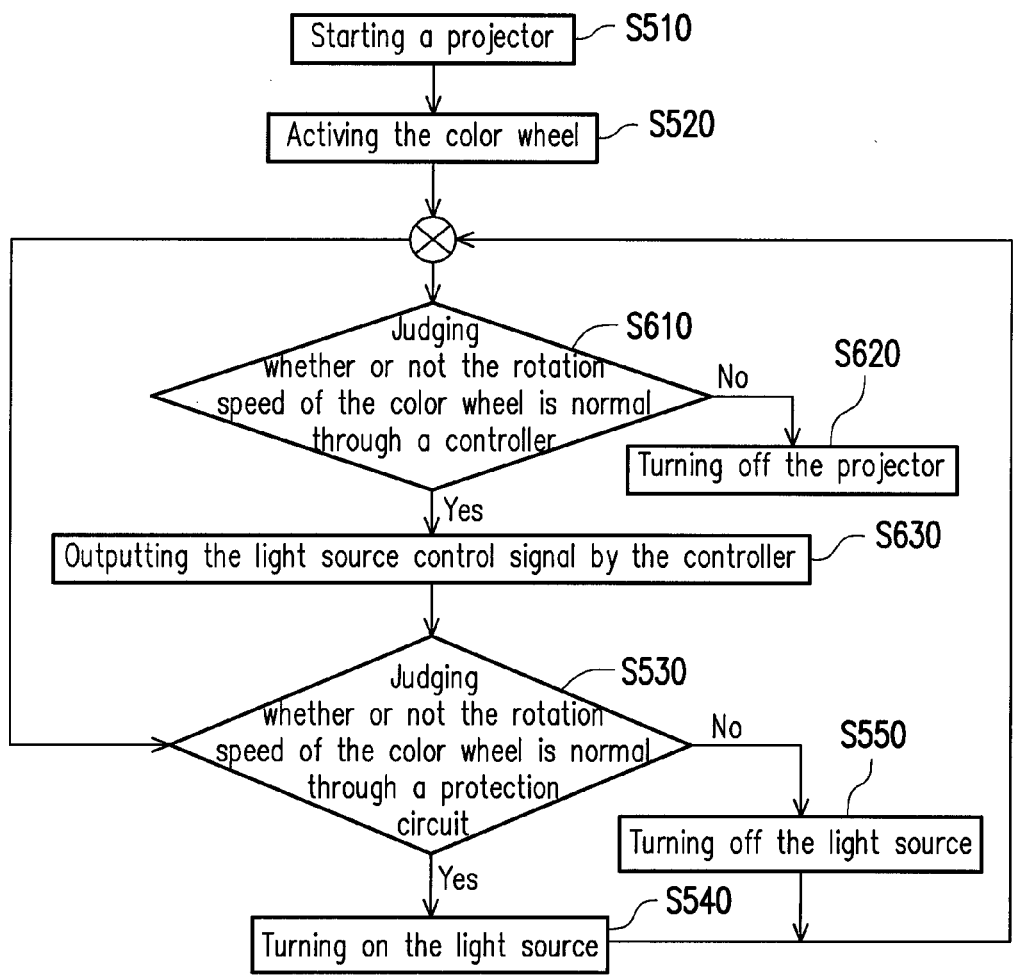
FIG. 6 is a flowchart of a color wheel protection method according to yet an embodiment of the invention.

Referring to FIG. 6, in the embodiment, the color wheel protection method includes following steps: after starting a projector (step S510), activing the color wheel to make the color wheel start to rotate (step S520); then, in step S610, judging whether or not the rotation speed of the color wheel is normal through a controller; when the rotation speed of the color wheel is abnormal, i.e., the judgement result of step S610 is 'no', turning off the projector (step S620); when the rotation speed of the color wheel is normal, i.e., the judgement result of step S610 is 'yes', outputting the light source control signal by the controller (step S630), and then performing step S530; after performing step S540 or step S550, going back to step S610 or step S530 for durably judging whether or not the rotation speed of the color wheel is normal.

The above-mentioned sequence (steps S410, S420, S430, S510, S520, S530, S540, S550, S610, S620, and S630) is an example, and the invention is not limited to the sequence. The details of the above-mentioned steps (steps S410, S420, S430, S510, S520, S530, S540, S550, S610, S620, and S630) may refer to the embodiments of FIGS. 1-3, and are not described herein repeatedly.

In summary, the embodiments of the invention may achieve at least one of the following advantages. The projector, the color wheel protection circuit, and the color wheel protection method of the embodiment of the invention may reset the light source control signal provided to the light source of the projector according to the rotation speed of the color wheel so that whether the illumination beam provided to the color wheel or not may be decide and thereby the damage of the color wheel may be further avoided. In the embodiments of the invention, when the rotation speed of the color wheel is abnormal, the light source of the projector is turned off and the operation-abnormal color wheel irradiated by the illumination beam is avoided and thereby the lifetime of the color wheel and the imaging quality of the projector may be advanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. In addition, the terms of 'first', 'second' and the like in the description or the claims are used to name the elements or to distinguish different embodiments or scope, not to limit the upper limit or the lower limit of the quantity of the elements.

What is claimed is:

1. A projector, comprising:
   a color wheel;
   a rotation speed detector, adapted to detect a rotation speed of the color wheel to generate a detection signal;
   a controller, having a first input end for receiving the detection signal, and having a first output end for providing a first light source control signal;
   a protection circuit, having a second input end, a third input end, and a second output end, wherein the second input end is electrically connected to the first input end of the controller and the rotation speed detector, the third input end is electrically connected to the first output end of the controller, and the protection circuit comprises:
      a resetting signal generator, receiving the detection signal through the second input end, comprising a rotation speed judgement unit, and adapted to generate a resetting output signal according to the rotation speed of the color wheel judged by the rotation speed judgement unit, wherein the rotation speed judgement unit is adapted to receive the detection signal through the second input end to judge the rotation speed of the color wheel; and
      a logic operator, having a first input, a second input and an output, receiving the first light source control signal transmitted from the first output end of the controller through the first input and the resetting output signal transmitted from the resetting signal generator through the second input, resetting the first light source control signal to a second light source control signal according to the resetting output signal, and outputting the second light source control signal through the output, wherein the first input of the logic operator is electrically connected to the first output end of the controller through the third input end of the protection circuit, and the second input of the logic operator is electrically connected to the resetting signal generator; and
   a light source, controlled by the second light source control signal transmitted from the output of the logic operator to provide an illumination beam to the color wheel, wherein the light source is electrically connected to the output of the logic operator through the second output end of the protection circuit,
   wherein when the rotation speed of the color wheel judged by the rotation speed judgement unit is less than a predetermined speed, the resetting signal generator is adapted to make the resetting output signal transited to a second logic level from a first logic level,
   wherein when the rotation speed of the color wheel judged by the rotation speed judgement unit is equal to or greater than the predetermined speed, the resetting output signal is at the first logic level, and
   wherein the second light source control signal is the same as the first light source control signal and the second light source control signal is adapted to turn on the light source when the resetting output signal is at the first logic level and when the controller outputs the first light source control signal to turn on the light source, wherein the logic operator is adapted to output the second light source control signal to turn off the light source when the resetting output signal is at the second logic level.

2. The projector as claimed in claim 1, wherein whether the light source providing the illumination beam or not is controlled by the logic operator according to the second light source control signal and the resetting output signal.

3. The projector as claimed in claim 1, wherein:
   the rotation speed detector is electrically connected to the color wheel and the resetting signal generator, and the rotation speed detector provides the detection signal to the resetting signal generator.

4. The projector as claimed in claim 3, wherein the controller is electrically connected to the rotation speed detector, and generates the first source control signal according to the detection signal.

5. The projector as claimed in claim 1, wherein the detection signal is a periodical pulse signal.

6. The projector as claimed in claim 1, wherein the resetting signal generator generates a resetting trigger signal according to a pulse width of the detection signal, and the resetting output signal is generated according to the resetting trigger signal.

7. The projector as claimed in claim 1, wherein the rotation speed judgement unit generates a resetting trigger signal according to the rotation speed of the color wheel, and the resetting signal generator further comprises:
   a signal-resetting unit coupled to the rotation speed judgement unit, and generating the resetting output signal according to the resetting trigger signal.

8. A color wheel protection circuit, comprising:
   a resetting signal generator, receiving a detection signal from a rotation speed detector of a projector, comprising a rotation speed judgement unit, and adapted to generate a resetting output signal according to a rotation speed of a color wheel of the projector judged by the rotation speed judgement unit; and
   a logic operator, having a first input, a second input, and an output, receiving a first light source control signal transmitted from a first output end of a controller of the projector through the first input and the resetting output signal transmitted from the resetting signal generator through the second input, resetting the first light source control signal to a second light source control signal provided to a light source of the projector according to the resetting output signal, and outputting the second light source control signal through the output, wherein the first input of the logic operator is electrically connected to the first output end of the controller, and the second input of the logic operator is electrically connected to the resetting signal generator,
   wherein the rotation speed detector generates the detection signal according to the rotation speed of the color wheel, a first input end of the controller is adapted to receive the detection signal from the rotation speed detector, and the first output end of the controller is adapted to provide the first light source control signal,
   wherein the color wheel protection circuit has a second input end, a third input end, and a second output end, the second input end is electrically connected to the first input end of the controller and the rotation speed detector, the third input end is electrically connected to the first output end of the controller, the rotation speed judgement unit is adapted to receive the detection signal through the second input end to judge the rotation speed of the color wheel, and the light source is electrically connected to the output of the logic operator through the second output end of the color wheel protection circuit, the first input of the logic operator is electrically connected to the first output end of the controller through the third input end of the color wheel protection circuit, wherein when the rotation speed of the color wheel judged by the rotation speed judgement unit is less than a predetermined speed, the resetting signal generator is adapted to make the resetting output signal transited to a second logic level from a first logic level, wherein when the rotation speed of the color wheel judged by the rotation speed judgement unit is equal to or greater than the predetermined speed, the resetting output signal is at the first logic level, and wherein the second light source control signal is the same as the first light source control signal and the second light source control signal is adapted to turn on the light source when the resetting output signal is at the first logic level and when the controller outputs the first light source control signal to turn on the light source, wherein the logic operator is adapted to output the second light source control signal to turn off the light source when the resetting output signal is at the second logic level.

9. The color wheel protection circuit as claimed in claim 8, wherein whether the light source of the projector providing an illumination beam to the color wheel or not is controlled by the logic operator according to the second light source control signal and the resetting output signal.

10. The color wheel protection circuit as claimed in claim 8, wherein the rotation speed detector is electrically connected to the color wheel and the resetting signal generator.

11. The color wheel protection circuit as claimed in claim 8, wherein the detection signal is a periodical pulse signal.

12. The color wheel protection circuit as claimed in claim 8, wherein the resetting signal generator generates a resetting trigger signal according to a pulse width of the detection signal, and the resetting output signal is generated according to the resetting trigger signal.

13. The color wheel protection circuit as claimed in claim 8, wherein the rotation speed judgement unit generates a resetting trigger signal according to the rotation speed of the color wheel, and the resetting signal generator further comprises:
a signal-resetting unit coupled to the rotation speed judgement unit, and generating the resetting output signal according to the resetting trigger signal.

14. A color wheel protection method, adapted for a projector comprising a color wheel, a rotation speed detector, a controller, a protection circuit, and a light source, the color wheel protection method comprising:
generating a detection signal by the rotation speed detector according to a rotation speed of the color wheel;
providing a first light source control signal by the controller, wherein the control has a first input end for receiving the detection signal and a first output end for providing the first light source control signal;
generating a resetting output signal by a resetting signal generator of the protection circuit according to the rotation speed of the color wheel judged by a rotation speed judgement unit of the resetting signal generator, wherein the protection circuit has a second input end, a third input end, and a second output end, the second input end is electrically connected to the first input end of the controller and the rotation speed detector, the third input end is electrically connected to the first output end of the controller, and the rotation speed judgement unit is adapted to receive the detection signal through the second input end to judge the rotation speed of the color wheel;

resetting the first light source control signal from the controller to a second light source control signal provided to the light source by a logic operator of the protection circuit according to the resetting output signal, wherein the logic operator has a first input, a second input, and an output, the first light source control signal transmitted from the first output end of the controller is received by the logic operator through the first input, the resetting output signal transmitted from the resetting signal generator is received by the logic operator through the second input, and the logic operator outputs the second light source control signal through the output, wherein the first input of the logic operator is electrically connected to the first output end of the controller through the third input end of the protection circuit, and the second input of the logic operator is electrically connected to the resetting signal generator; and controlling the light source by the second light source control signal transmitted from the output of the logic operator to provide an illumination beam to the color wheel, wherein the light source is electrically connected to the output of the logic operator through the second output end of the protection circuit, wherein a step of generating the resetting output signal by the resetting signal generator of the protection circuit according to the rotation speed of the color wheel comprises: when the rotation speed of the color wheel judged by the rotation speed judgement unit is less than a predetermined speed, the resetting output signal is transited to a second logic level from a first logic level, and when the rotation speed of the color wheel judged by the rotation speed judgement unit is equal to or greater than the predetermined speed, the resetting output signal is at the first logic level, and wherein the second light source control signal is the same as the first light source control signal and the second light source control signal is adapted to turn on the light source when the resetting output signal is at the first logic level and when the controller outputs the first light source control signal to turn on the light source, wherein the second light source control signal is outputted to the light source to turn off the light source when the resetting output signal is at the second logic level.

15. The color wheel protection method as claimed in claim 14, further comprising:
controlling whether the light source is to provide the illumination beam to the color wheel or not according to the second light source control signal and the resetting output signal.

16. The color wheel protection method as claimed in claim 14, wherein a step of generating the resetting output signal by the resetting signal generator of the protection circuit according to the rotation speed of the color wheel further comprises:
generating a resetting trigger signal according to a pulse width of the detection signal; and
generating the resetting output signal according to the resetting trigger signal.

* * * * *